United States Patent [19]
Schlaud et al.

[11] Patent Number: 5,312,179
[45] Date of Patent: May 17, 1994

[54] CABINET SURROUND

[75] Inventors: Michael J. Schlaud, Columbiaville; David L. Carrol, Imlay City, both of Mich.

[73] Assignee: Trayco, Inc., Lapeer, Mich.

[21] Appl. No.: 115,373

[22] Filed: Sep. 1, 1993

Related U.S. Application Data

[63] Continuation of Ser. No. 742,972, Aug. 9, 1991, abandoned.

[51] Int. Cl.⁵ ............................... A47B 67/02
[52] U.S. Cl. ...................... 312/242; 52/34; 4/584
[58] Field of Search ............... 49/408, 413; 312/139.2, 312/245, 405, 242, 405.1; 4/614, 549, 555, 584, 612; 52/34, 35

[56] References Cited

U.S. PATENT DOCUMENTS

| | | | |
|---|---|---|---|
| 2,463,238 | 3/1949 | Bissell et al. | 312/139.2 |
| 3,827,086 | 8/1974 | Seymour | 4/584 |
| 4,003,171 | 1/1977 | Mitchell | 49/408 |
| 4,171,545 | 10/1979 | Kann | 52/35 |
| 4,361,368 | 11/1982 | Daniels | 312/245 |
| 4,424,598 | 1/1984 | Cima | 4/612 |
| 4,457,031 | 7/1984 | Moore | 52/35 |
| 5,100,213 | 3/1992 | Vandarakis et al. | 312/405 |

Primary Examiner—Kenneth J. Dorner
Assistant Examiner—Gerald A. Anderson
Attorney, Agent, or Firm—Myron B. Kapustij; Malcolm L. Sutherland

[57] ABSTRACT

A vacuum formed plastic bathtub and shower surround including a cabinet comprising a back wall, a top wall, a bottom wall, and two side walls having a sliding door guide channel in the interior surfaces of at least said top and bottom walls.

8 Claims, 3 Drawing Sheets

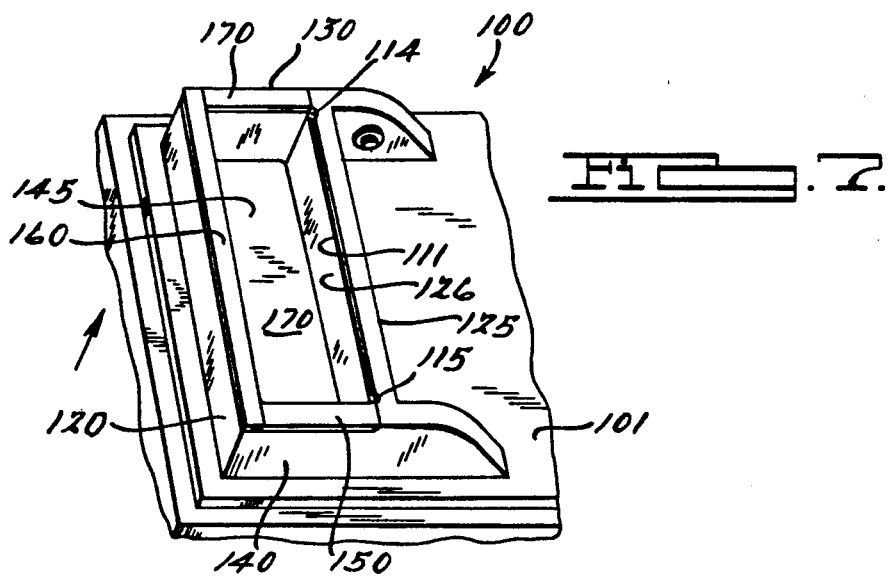
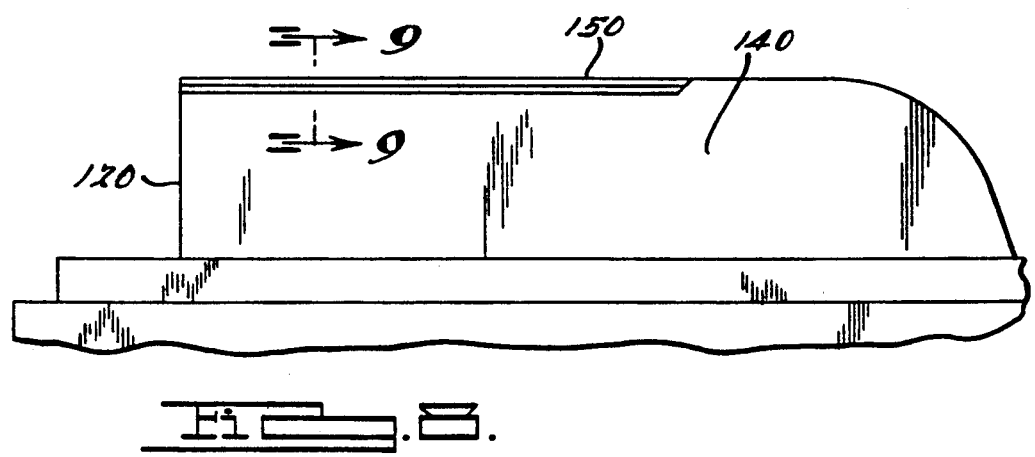
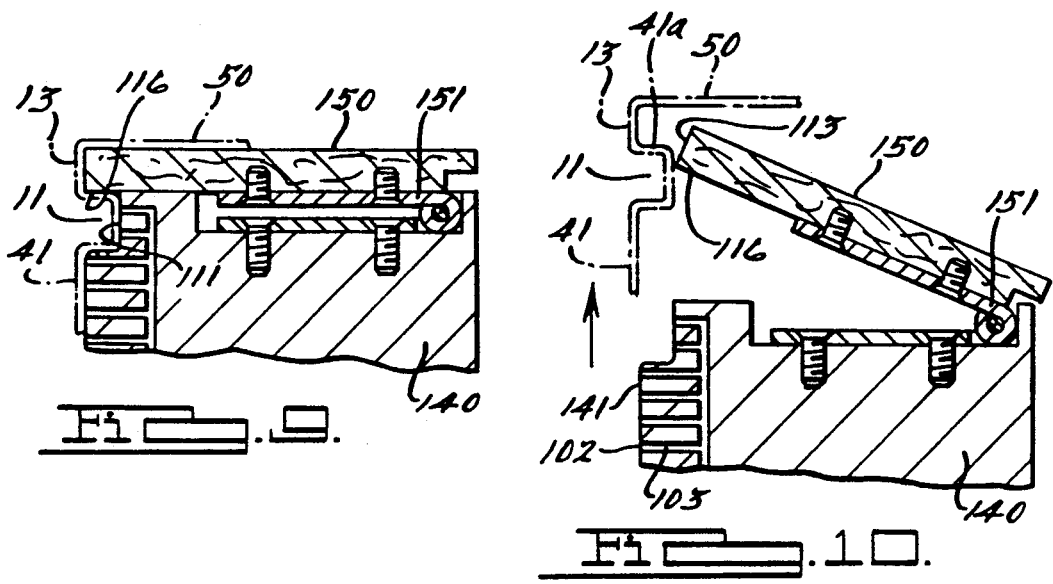

CABINET SURROUND

This is a continuation of copending application Ser. No. 07/742,972 filed on Aug. 9, 1991, now abandoned.

FIELD OF THE INVENTION

The instant invention relates to plastic vacuum formed surround panels including an integral cabinet for bathtubs and showers, and to a method for manufacturing such surrounds.

BACKGROUND OF THE INVENTION

Plastic bathtub and shower surrounds are finding increasing acceptance and use as substitutes for tiled surrounds. In spite of the popularity of tiled surrounds, these surrounds present certain problems. First, the grout may become a breeding place for stain producing mildew. Once stained the grout is extremely difficult to clean since it is porous and the stain may permeate through the grout. Secondly, the grout may loosen and fall out of the spaces between the tiles. Once the grout is cracked moisture may seep in behind the tiles and loosen them from the supporting wall. In addition, tile is difficult to install in perfectly straight lines. Also, tile is relatively expensive and time consuming to install compared to other walls.

The currently available plastic surrounds are generally comprised of a plastic and may be made by a vacuum forming process. Some of these vacuum formed plastic surrounds include a cabinet for storage of various bathroom items such as shampoo, combs, and the like. Most of these cabinets have sliding doors.

Sliding doors are normally mounted in guide channels in the cabinet. Normally a top guide channel is provided in the top wall of the cabinet for the tops of the sliding doors, and a bottom guide channel is provided in the bottom wall of the cabinet for the bottoms of the sliding doors. Due to the extreme difficulty of forming integral guide channels in the interior surfaces of the cabinet walls using current vacuum forming techniques and equipment, vacuum formed plastic surrounds containing an integral vacuum formed cabinet heretofore have had guide channels provided by mounting guide channel units which are separate and distinct from the cabinet to the interiors of the top and bottom cabinet walls. These separate guide channel units are typically adhered to the interior top and bottom surfaces of the cabinet by means of a suitable adhesive. This is a time consuming procedure and entails extra costs associated with the material cost of these separate guide channel units and the additional labor cost incurred in their installation.

The present invention remedies these problems by providing a vacuum formed surround panel which includes channels formed in at least the inner top and bottom surfaces of the cabinet adjacent the open side thereof.

SUMMARY OF THE INVENTION

The instant invention comprises a vacuum formed plastic bathtub and/or shower surround panel having an integral cabinet which is provided with an integral substantially U-shaped door guide channel in the inner surfaces of said cabinet adjacent the open side thereof. The guide channel is formed during the vacuum forming of the surround panel.

BRIEF DESCRIPTION OF THE DRAWINGS

FIG. 7 a perspective partial view of a vacuum forming jig used in the production of the surround panel of FIG. 1 illustrating the cabinet forming section of the jig;

FIG. 8 an enlarged side elevational view of the cabinet forming section of the jig;

FIG. 9 is a cross-sectional view taken along line 9—9 in FIG. 8 showing the flap in a down and locked position; and FIG. 10 is a view similar to FIG. 9 except that the flap is in an up and open position.

DETAILED DESCRIPTION OF THE PREFERRED EMBODIMENTS

Figure 1:
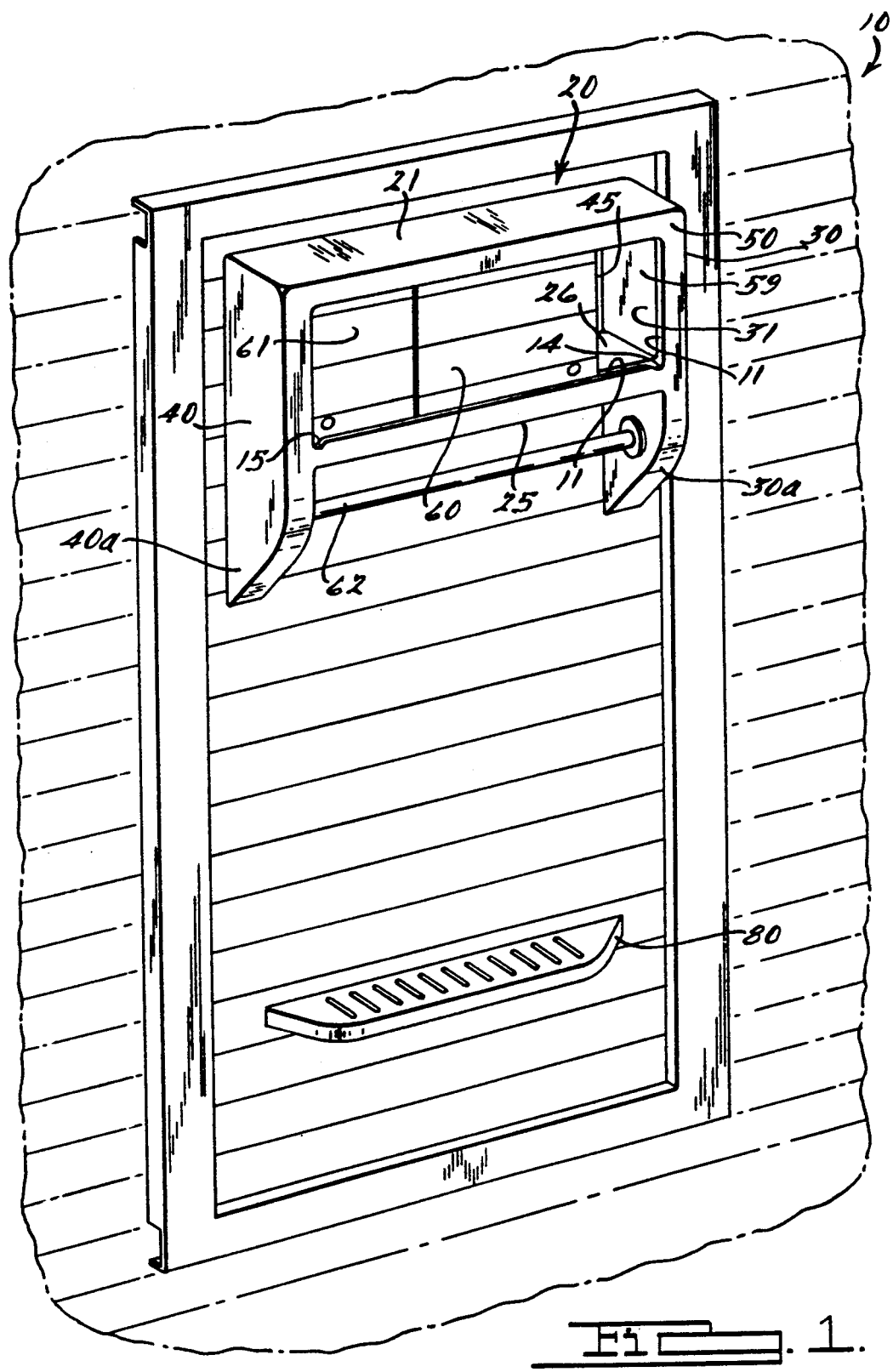
FIG. 1 is a front perspective view of a section of the surround panel of the instant invention having an integrally formed cabinet.

A plastic bathtub and/or shower surround typically is comprised of a plurality of panels joined together. A portion of one such panel 10 having an integrally formed cabinet 20 is illustrated in FIG. 1. Such surround panel may also optionally have a shelf 80 integral therewith. The cabinet 20 is comprised of top wall 21, bottom wall 25, side wall 30, side wall 40, back wall 45, and front facing 50. Cabinet 20 has an open front 59. Top wall 21 has an inner surface 22, bottom wall 25 has an inner surface 26, side wall 30 has an inner surface 31, and side wall 40 has an inner surface 41 (not shown). Door guide channel 11, preferably having a substantially U-shaped cross-section, is formed in the inner surfaces 22, 26, 31 and 41 adjacent the front facing 50. Channel 11 preferably extends around the entire inner perimeter of the cabinet.

In a preferred embodiment the depth and width of channel 11 varies depending upon its location, being deepest and widest in inner surfaces 22, 31 and 41, and shallower and narrower in inner surface 26. In the embodiment illustrated in FIGS. 2–6 channel 11 in inner surfaces 22, 31 and 41 has the same depth and width, e.g., it is about 0.5 inch wide and about 0.25 inch deep. Channel 11 is narrower and shallower in inner surface 26, e.g., about 0.10 inch deep and about 0.47 inch wide.

A lip 13 is defined by channel 11 and front facing 50. Lip 13 is located outward of channel 11 and forms the inner perimeter of and defines open front 59. Lip 13 preferably extends around the inner perimeter of the cabinet. In the embodiment illustrated in the drawings the section of lip 13 located on the inner surface 26 of the bottom wall, i.e., 13a, is shorter than lip sections located in inner surfaces 22, 31 and 41, i.e., it is below inner surface 26. In another embodiment of the instant invention lip 13 is of the same height as inner surface 26 and is even therewith.

Figure 2:
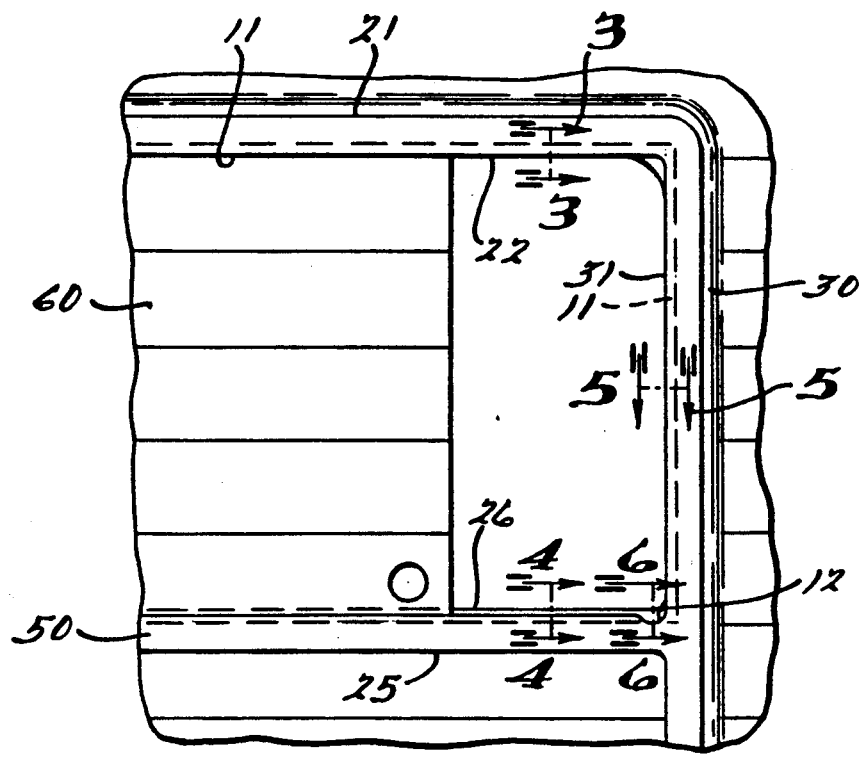
FIG. 2 is an enlarged partial front view of the cabinet of the instant invention.
Figure 3:
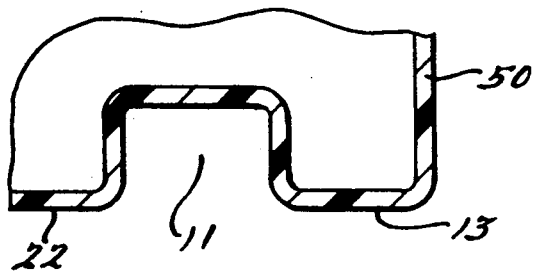
FIG. 3 is a cross-sectional view taken along line 3—3 in FIG. 2.
Figure 5:
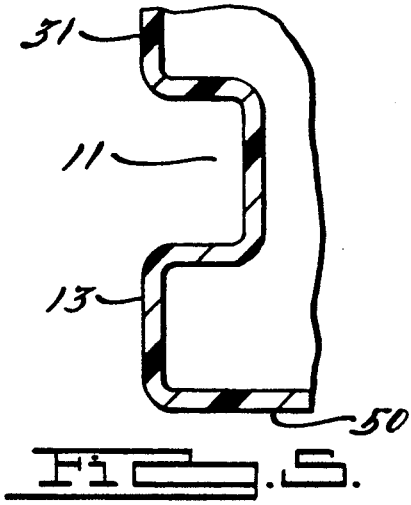
FIG. 5 is a cross-sectional view taken along line 5—5 in FIG. 2.
Figure 4:
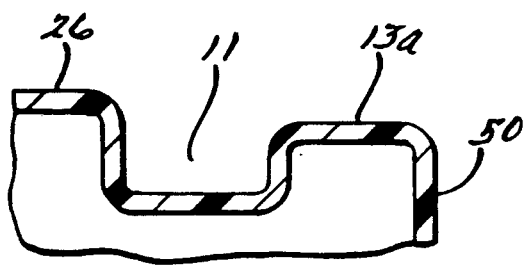
FIG. 4 is a cross-sectional view taken along line 4—4 in FIG. 2.
Figure 6:
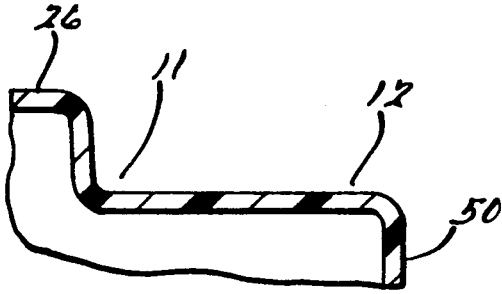
FIG. 6 is a cross-sectional view taken along line 6—6 in FIG. 2.

Two spillways 14 and 15 are located in the inner surface 26 adjacent side walls 30 and 40. The two spillways 14 and 15 connect channel 11 in inner surface 26 of bottom wall with the area exterior of the cabinet and are adapted to allow any water collected in channel 11 in inner surface 26 to drain out. As illustrated in FIGS. 1, 2 and 6 lip 13 terminates at the edge of spillways 14 and 15.

Two sliding doors 60 and 61 are slidingly mounted in channel 11, with the tops of said doors being disposed in channel 11 in the inner surface 22 of top wall 21 and the bottom of said doors being disposed in channel in the inner surface 26 of bottom wall 25. When in this closed positions the side edges of the doors 60 and 61 fit into the channel 11 in the inner surfaces 31 and 41 of side walls 30 and 40.

As illustrated in FIG. 1 a towel bar 62 may be optionally mounted in extensions 30a and 40a of side walls 30 and 40.

The channel 11 is vacuum formed into interior surfaces 22, 31, 26 and 41 of cabinet 20 during the vacuum forming of panel 10.

The surround panel 10, including cabinet 20, is comprised of plastic, more particularly thermoplastic. Plastics, particularly thermoplastics useful in vacuum forming processes are well known to those in the art and are readily commercially available. Some illustrative non-limiting examples of such thermoplastics include styrene/acrylonitrile resins; styrene/acrylonitrile/butadiene resin; styrene/butadiene resins, polyolefins such as polyethylene, polypropylene and olefins copolymers and blends, polymethyl methacrylate, polystyrene, polyvinyl chloride, and polyvinylidene chloride.

In one embodiment the surround 10 is comprised of polystyrene.

As best illustrated in FIGS. 1 and 2 sliding doors 60 and 61 are mounted in channel 11. The doors are mounted in channel 11 by inserting their top ends into channel 11 in surface 22 and their bottom ends into channel 11 in surface 26. Channel 11 in surfaces 31 and 41 functions to receive the side edge of each door, thereby providing the additional advantage of substantially preventing ingress of of water into the interior of the cabinet when the doors are closed. The doors 60, 61 are also preferably made of a plastic. While any suitable plastic can be used, the doors are preferably comprised of polystyrene.

The surround panel 10, including the integral cabinet 20 and the integral door guide channel 11, is vacuum formed using, with the exceptions described herein, standard and well known vacuum forming techniques and processes. Such well known vacuum forming techniques include heating a sheet of thermoplastic material either before or after it is placed on a vacuum forming jig 100; using vacuum to draw the heated plastic sheet over the shaped surface of the jig to vacuum form the sheet; cooling the formed sheet; and removing the formed sheet from the jig.

A vacuum forming jig 100 used to vacuum form the instant surround panel 10 is illustrated in FIGS. 7-10. With the exception of flaps 150, 160 and 170, and their associated structures and operation, the jig 100 and its operation is conventional and well known to those skilled in the art.

Jig 100 includes a shaped form 120 protruding from its surface 101. Form 120 is shaped to form cabinet 20. Form 120 includes a top wall 120, a back wall 145, two side walls 130 and 140, and a bottom wall 125. Back wall 145, top wall 120, bottom wall 125 and the two side walls 130 and 140 define a cavity 170 corresponding to the interior of the cabinet 20.

As best seen in FIG. 7 a channel 111 is provided in the inner surface 126 of bottom wall 125. This channel 111 substantially corresponds in form, shape and size to channel 11 in the inner surface 26 of wall 25 of cabinet 20.

A plurality of vacuum ports 102 communicating with vacuum lines 103 are provided over the entire surface 101 of the jig 100 which comes in contact with the plastic sheet which is to be vacuum formed. The vacuum lines are in communication with a vacuum source. When the unformed plastic sheet is to be drawn over shaped surface 101 of jig 100, vacuum is used to conform the sheet to the surface 101. When the formed sheet is ready for removal from the jig 100 vacuum is terminated. This type of vacuum forming operation is conventional and well known in the art.

The flaps 150, 160 and 170 operate in substantially the same manner and are, except for their dimensions, substantially the same. Therefore, only the operation and construction of flap 150 will be described in detail, it being understood that flaps 160 and 170 correspond in structure and operation to flap 150.

As illustrated in FIGS. 9 and 10 flap 150 is separate from the jig 100. It comprises a thin rectangular member which is longer than it is wide. Flap 150 is pivotably or swingingly mounted at one end thereof to the top of side wall 140 by hinge means 151. In its closed position, as illustrated in FIG. 9, flap 150 abuts and is parallel to the top surface of side wall 140. Flap 150, as illustrated in FIG. 10, opens by swinging upwardly. Flap 150 is locked in its closed position by any known and conventional means. These mean include but are not limited to air pressure cylinders (not shown) which maintain flap 150 in the closed position when vacuum is being applied to draw the sheet over the shaped surface 101, but which allow flap 150 to open when application of vacuum is terminated.

The inner surface 141 of wall 140 and the bottom end surface 116 of flap 150 define channel 111 which substantially corresponds in shape and size to channel 11 in cabinet 20. It is to be understood that channel 111 is slightly larger than corresponding channel 11.

The end 113 of flap 150 substantially corresponds in size and shape to lip 13 in cabinet 20.

In operation of the vacuum forming process and jig 100, a heated sheet is placed in contact with surface 101 of jig 100. Vacuum is applied to this plastic sheet to draw it tightly over surface 101 until it conforms to the shape of outer surface 101. In FIGS. 9 and 10 a channel 11 and lip 13 are shown being vacuum formed in the sheet.

After the sheet is vacuum formed it is cooled and removed from the jig 100. As best illustrated in FIGS. 7 and 10 the formed sheet is removed from the jig in the direction of the arrow. Since channel 11, as illustrated in FIGS. 9 and 10, is rather deep, that portion of the sheet defining side 41a of the channel abuts against the inner surface 116 of flap 150 which forms side 41a. The sheet is therefore rather difficult to remove from the jig and may be torn or damaged during removal.

However, due to the fact that flap 150 hinges upwardly out of the way of side 41a the formed sheet can easily be removed, as illustrated in FIG. 10, from the jig without any damage.

In one embodiment of the invention the flap 150 is locked in its closed position, as illustrated in FIG. 9, during vacuum forming of the sheet. When the formed sheet is ready for removal the flap is unlocked and can be readily pivoted to its open position, as illustrated in FIG. 10. Movement of the sheet in the direction of the arrows in FIGS. 7 and 10 results in side 41a exerting an upward force on the surface 116 of flap 150 thereby pivoting flap 150 upwardly and allowing easy removal of the vacuum formed sheet. The flap 150 is designed to be freely rotating once the locking source is disengaged from flap 150, thereby requiring only a minor upward force on surface 116 to pivot flap 150 upwardly.

In one preferred embodiment the jig 100 is comprised of aluminum while the flaps 150, 160 and 170 are comprised of wood. It is contemplated that the flaps need not be restricted to wood but can be made of other materials such as aluminum or other metals.

In the embodiment illustrated in FIG. 7 no flap is provided on the top of bottom wall 125. This is due to the fact that the channel 11 in inner surface 26 of the cabinet 20 is rather shallow. Therefore, channel 111 in surface 126 is also rather shallow. Removal of the formed sheet from this rather shallow channel does not present the problems encountered with the deeper channels 111 in side walls 131, 140 and top wall 120. Thus, a flap is not essential in the top of bottom wall 125.

However, in another embodiment of the invention a flap is provided on the top of wall 125. In this embodiment all four walls 125, 131, 140 and 150 contain flaps on their tops.

As illustrated in FIG. 7 forms 114 and 115 corresponding to spillways 14 and 15 are provided in the wall 126.

The method of forming the surround panel 10 of the instant invention comprises actuating closing means to hold the flaps 150, 160 and 170 in a closed and locked position during vacuum forming of the plastic sheet, deactivating the closing means holding the flaps closed in order to unlock the flaps prior to removal of the vacuum formed sheet, and removing the vacuum formed sheet from the jig whereby movement of the sheet away from the surface of the jig will pivot the flaps 150, 160 and 170 away from the surface of the jig thereby facilitating removal of the vacuum formed sheet.

What is claimed is:

1. An improved vacuum formed plastic surround panel for bathtubs and showers having a cabinet formed integrally therewith, said cabinet comprising a back wall having an interior surface, a top wall having an interior surface, a bottom wall having an interior surface, a first side wall having an interior surface, a second side wall having an interior surface, and an open front adapted to be closed by horizontally sliding doors, the improvement comprising:

a single substantially U-shaped top guide channel adapted to receive the tops of sliding doors vacuum formed integrally in said interior surface of said top wall; a single substantially U-shaped bottom guide channel adapted to receive the bottoms of sliding doors vacuum formed integrally in said interior surface of said bottom wall; a first single side channel connecting said top guide channel and said bottom guide channel vacuum formed integrally in said interior surface of said first side wall, said first side channel adapted to receive the side edges of sliding doors; and a second single side channel connecting said top guide channel and said bottom guide channel vacuum formed integrally in said interior surface of said second side wall, said second side channel adapted to receive the side edges of sliding doors.

2. The surround of claim 1 wherein said top guide channel, bottom guide channel, first side channel and second side channel are adjacent said open front.

3. The surround of claim 1 wherein said channel formed in the interior surface of the bottom wall has a bottom, a back wall, and a front wall; and
wherein at least one spillway is formed extending through said front wall of said channel.

4. The surround of claim 3 wherein said spillway is adjacent to at least one of said side walls.

5. The surround of claim 4 wherein two spillways are formed in said guide channel, each spillway being adjacent one of said side walls.

6. The surround of claim 1 wherein said guide channel in said top and said bottom wall is horizontally extending.

7. The surround of claim 1 wherein said guide channel formed in said first side wall and said second side wall is vertically extending.

8. The surround of claim 1 wherein said channel in said interior surface of said bottom wall is shallower than said channel in said interior surface of said top wall.

* * * * *